United States Patent [19]

Arps

[11] 3,989,010
[45] Nov. 2, 1976

[54] DESULFURIZATION OF HIGH SULFUR FUELS DURING COMBUSTION

[76] Inventor: Jan J. Arps, 414 Peavy Road, Dallas, Tex. 75218

[22] Filed: Oct. 23, 1975

[21] Appl. No.: 624,854

Related U.S. Application Data

[62] Division of Ser. No. 483,308, June 26, 1974, Pat. No. 3,933,127.

[52] U.S. Cl. .................................. 122/1 R; 110/1 J; 110/7 R; 23/288 R; 423/210.5
[51] Int. Cl.² .......................... F22B 1/06; F23G 7/00
[58] Field of Search .................. 122/1; 110/1 J, 1 K, 110/7 R, 8 R; 48/92; 23/288 R; 423/210.5

[56] References Cited
UNITED STATES PATENTS

| | | | |
|---|---|---|---|
| 3,369,504 | 2/1968 | Oster | 110/1 |
| 3,533,739 | 10/1970 | Pelczarski et al. | 48/92 |
| 3,642,583 | 2/1972 | Greenberg et al. | 110/8 |
| 3,647,358 | 3/1972 | Greenberg | 423/210.5 |
| 3,668,120 | 6/1972 | Patterson | 110/8 |
| 3,708,270 | 1/1973 | Birk et al. | 110/8 |
| 3,710,737 | 1/1973 | Birk | 110/1 |
| 3,763,830 | 10/1973 | Robinson et al. | 110/8 X |
| 3,785,780 | 1/1974 | Teichmann et al. | 423/210.5 |

*Primary Examiner*—Kenneth W. Sprague
*Attorney, Agent, or Firm*—Richards, Harris and Medlock

[57] ABSTRACT

A simplified and continuous process for the removal of sulfur compounds and other impurities such as silicates from high sulfur coal or fuel oil during combustion in a molten salt bath containing a collector which reacts with the sulfur and other impurities. Sulfate and silicate impurities together with other by-products are removed by gravity separation from the molten salt bath as slurry from which the soluble salts may be regenerated and recycled continuously. Flue gases are recycled through the molten salt bath for sulfur-free emission to the atmosphere.

23 Claims, 3 Drawing Figures

DESULFURIZATION OF HIGH SULFUR FUELS DURING COMBUSTION

This is a division of application Ser. No. 483,308 filed June 26, 1974, now U.S. Pat. No. 3,933,127.

FIELD OF THE INVENTION

This invention relates to the removal of sulfur impurities during the combustion of sulfur-containing carbonaceous material such as coal or fuel oil. In one aspect, this invention relates to a process whereby high sulfur coal or fuel oil is burned in a molten salt bath to which a sulfur collector such as an alkaline-earth metal oxide or carbonate has been added, which collector combines with the sulfur impurities to form insoluble compounds that thereafter are removed from the salt bath. In another aspect, this invention relates to a novel process for the generation of steam by combustion of high sulfur coal or fuel oil featuring the recovery of sulfur oxides before they are emitted into the atmosphere.

DESCRIPTION OF THE PRIOR ART

In industrial plants where large quantities of high pressure steam are required for a wide variety of purposes, the steam is generated in boilers fired by gas, oil, coal in solid form, or pulverized coal. The flue gases resulting from such combustion contain impurities, the most noxious of which is sulfur dioxide.

Whenever a fuel contains sulfur, some sulfur dioxide will be contained in the gaseous products of combustion. The sulfur in coal occurs in three forms: (1) pyritic sulfur in the form of a pyrite or marcasite; (2) organic sulfur, which consists of sulfur chemically combined with the coal substance; and (3) sulfate sulfurs, which appear as iron or calcium sulfates. During combustion of a coal, from 70 to 90 percent of the sulfur appears in the combustion product as sulfur dioxide.

A petroleum refinery separates certain fractions of crude petroleum to acquire the necessary properties for use as a fuel oil. The commercial fuel oil that the refiners sell is usually a blend in various proportions of some of the materials separated by primary distillation with some of the products of destructive distillation. The composition of the fuel oils usually ranges from 83 to 87 percent carbon content together with 11 to 13 percent of hydrogen content, the remainder consisting for the most part of sulfur and water. As in the case of coal, most of the sulfur appears in the combustion product as sulfur dioxide.

Based on the Environmental Protection Agency's ambient air quality standards, states have adopted strict laws to limit the amount of sulfur in fuels or the amount of sulfur dioxide in stack emissions. The mean U.S. Standard of sulfur in fuels is rapidly becoming 0.7 weight percent while the larger consuming areas already limit sulfur content to 0.5 and 0.3 weight percent.

In the United States, coal is abundant and widespread. On a uniform calorific basis, coal constitutes 68 percent of the total estimated recoverable reserves of fossil fuels in the United States; petroleum and natural gas, about 16 percent; and oil in oil shale about 16 percent. Unfortunately, only 11 percent of the nation's coal reserves east of the Mississippi River have a sulfur content less than 0.7 weight percent, and most of these reserves are committed to steel making. The remaining coal reserves in this area have sulfur contents up to 4.5 weight percent. Thus, a major portion of the nation's energy supply is unavailable without a practical and economical process of removing the sulfur from the sulfur coals.

The use of fuel oil is equally restricted because of sulfur content. U.S. domestic crudes typically contain from 1.1 to 3.2 weight percent of sulfur, while imported crude oils contain from 2.2 to 5.8 weight percent of sulfur.

Various solutions to the problem of making the available high sulfur coal or fuel oil available for electric power generation under the existing EPA's air quality standards have been considered:

1. Gasification of high sulfur coal to produce low sulfur gas for power plant consumption involves not only heating the coal, as in distillation, but also the subsequent reaction of the solid residue with air, oxygen, steam, or various mixtures of each. The March 1974 issue of *Scientific American*, pages 19–25, describes methods of coal gasification which are commercially available, in the pilot-plant stage, or proposed. Several processes for the gasification of coal are currently being developed under sponsorship of the Office of Coal Research, but their cost appears to be very high.

2. Liquification of high sulfur coal to produce low sulfur liquids is fairly well known, but the development work is not as far along as in the case of coal gasification. Again, the cost of applying this method is very high.

3. Removal of sulfur compounds from coal prior to combustion has been attempted by pulverizing the coal and using conventional processes, such as gravity separation or flotation, to remove pyritic sulfur. Such a process, however, is very expensive and does not remove organically bound sulfur compounds. A solvent refining process to purify raw coal developed by the Office of Coal Research is described in *The Oil and Gas Journal* of Nov. 6, 1972, page 32.

4. Stack gas scrubbing to remove sulfur dioxide and similar impurities after combustion and before venting to the atmosphere is favored by many researchers. Recent literature includes Stone and Webster's ionics process described in *The Oil and Gas Journal* of Aug. 7, 1972, page 34; Allied Chemical's stack gas scrubbing process described in *The Oil and Gas Journal* of Aug. 7, 1972, page 40; IFP's stack gas clean-up process described in *The Oil and Gas Journal* of Aug. 6, 1973, page 67; Shell's flue gas desulfurization process described in *The Oil and Gas Journal* of Oct. 29, 1973, page 81; General Motor's stack gas scrubbing process described in the Nov. 12, 1973, issue of *Time* magazine; and American Air Filter Company's mobile bed contactor-scrubber process described in *The Oil and Gas Journal* of Jan. 21, 1974, page 92. Most of these stack gas purification processes are very expensive because of the large volume of low pressure gases to be treated and the resulting high cost of auxiliary facilities.

5. A fluidized-bed process to remove sulfur dioxide during combustion of coal has been announced by ESSO Research and Engineering Company in *The Oil and Gas Journal* articles of Aug. 28, 1972, page 32, and Nov. 20, 1972, page 83. In this process high-sulfur coal is burned under high pressure in a fluidized bed of limestone granules. The limestone combines with the sulfur from the coal to produce calcium sulfate, which is then circulated from the fluid bed to be regenerated in another reactor by means of a stream of reducing gas.

6. Processes for both direct and indirect desulfurization of whole crude, vacuum gas oil, or vacuum power bottom oil are presented in a 1973 booklet printed by The Petroleum Publishing Company of Tulsa, Ok., and entitled "Advances in Desulfurizatin of Petroleum Products". The processes entail the use of a fixed-bed catalytic reactor where liquid feed is exposed to hydrogen-rich recycle gas to moderate pressures and temperatures. Commercial experience shows that both iron and salts precipitate to the bottom rapidly in the first few feet of the catalyst bed and must be removed to prevent an excessive pressure drop across the reactor. The main desulfurization reactor may be preceded by a guard reactor to remove chemically bound iron and other impurities that are not removed in the feed filtration and desalting facilities.

The desulfurized liquid, product gases, and unreacted hydrogen leaving the reactor are cooled and then sent to the separation section. Most of the liquid product is recovered in a hot, high-pressure separator and passed to the product fractionator to recover naphtha and desulfurized residual fuel oil. The uncondensed gases from the high pressure separator are cooled and treated with water to remove ammonia and hydrogen sulfide before returning to the high-pressure reactor loop.

The present invention provides a simpler and less costly process for desulfurizing coal or fuel oil, whereby impurities are removed during combustion in a molten salt bath to which collectors have been added to convert sulfur dioxide to harmless compounds.

A prior art use of a molten salt bath is presented in U.S. Pat. No. 3,642,583 issued to Greenberg on Feb. 15, 1972, relating to a process for the distillation of water and the combustion of waste and other contaminants. The contaminated liquid is introduced with forced air onto the surface of the molten salt bath which is maintained at a temperature below the normal combustion temperature of organic waste matter. The salts comprising the bath may be catalytically behaving neutral salts or chemically active salts comprising chemical oxidizers. The salt bath causes evaporation of the water content and catalytically induces oxidation of the organic waste. The heat source may be provided by combustion of fuel within the salt bath itself. However, the process is directed to the elimination of organic waste rather than inorganic pollutants such as sulfur. Further, the organic wastes are catalytically oxidized rather than directly ignited. The process disclosed in the patent does not include the use of a "collector" or reactant for converting undesirable oxides into insoluble compounds which may be removed.

SUMMARY OF THE INVENTION

The present invention is directed to a method of reducing the sulfur oxide emissions in stack gases by burning sulfur-containing carbonaceous materials such as coal or fuel oil in a molten salt bath to which a collector for sulfur oxides and other impurities such as silicate impurities has been added. More particularly, the high sulfur carbonaceous material is introduced with a gas comprising oxygen such as air or oxygen into a vessel containing a molten salt bath such as, for example, a stable salt or salt mixture having a melting point below about 1600° F. To this molten salt bath, a collector, preferably an alkaline-earth metal oxide or carbonate such as, for example, powdered limestone, has been added. The collector reacts with the sulfur oxides generated during the combustion of the coal or fuel oil in the molten salt bath to form sulfates which are insoluble in the molten salt and precipitate therefrom. Likewise, the collector reacts with other impurities such as silicates to form insoluble compounds. The sulfate and silicate impurities together with possible valuable by-products are continuously removed by gravity separation as a slurry from the molten salt bath. The molten salt can be regenerated and recycled from the slurry in a continuous operation. Furthermore, a heat exchange fluid can be passed through suitable means such as a heat exchange coil immersed in the molten salt bath to extract thermal energy therefrom.

In one aspect of the invention, an airlift system is used to lift the accumulated slurry above the molten salt bath onto trays through which the flue gas will flow to be given an additional contact with the slurry prior to being vented to the atmosphere. The slurry is then dropped on a screen which removes particles of impurities such as the sulfates and silicates.

DESCRIPTION OF THE DRAWINGS

For a more complete understanding of the present invention and for further objects and advantages thereof, reference may now be had to the following description taken in conjuntion with the accompanying drawings in which.

DESCRIPTION OF PREFERRED EMBODIMENTS

Figure 1:
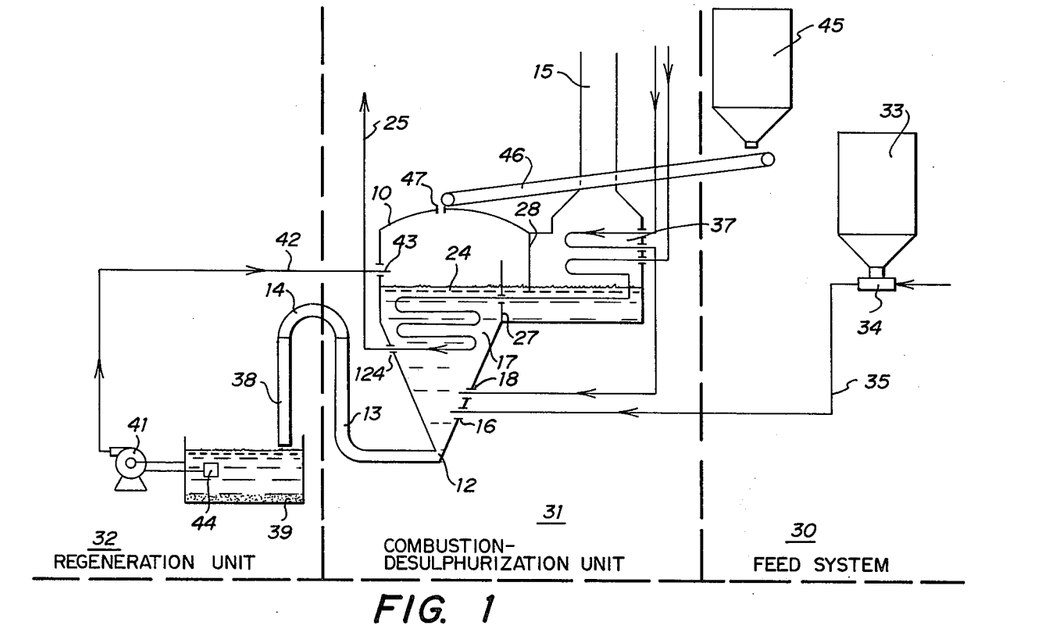
FIG. 1 is a diagrammatic illustration of a preferred embodiment of the invention including a feed system, a combustion-desulfurization unit, and a regeneration unit.
Figure 2:
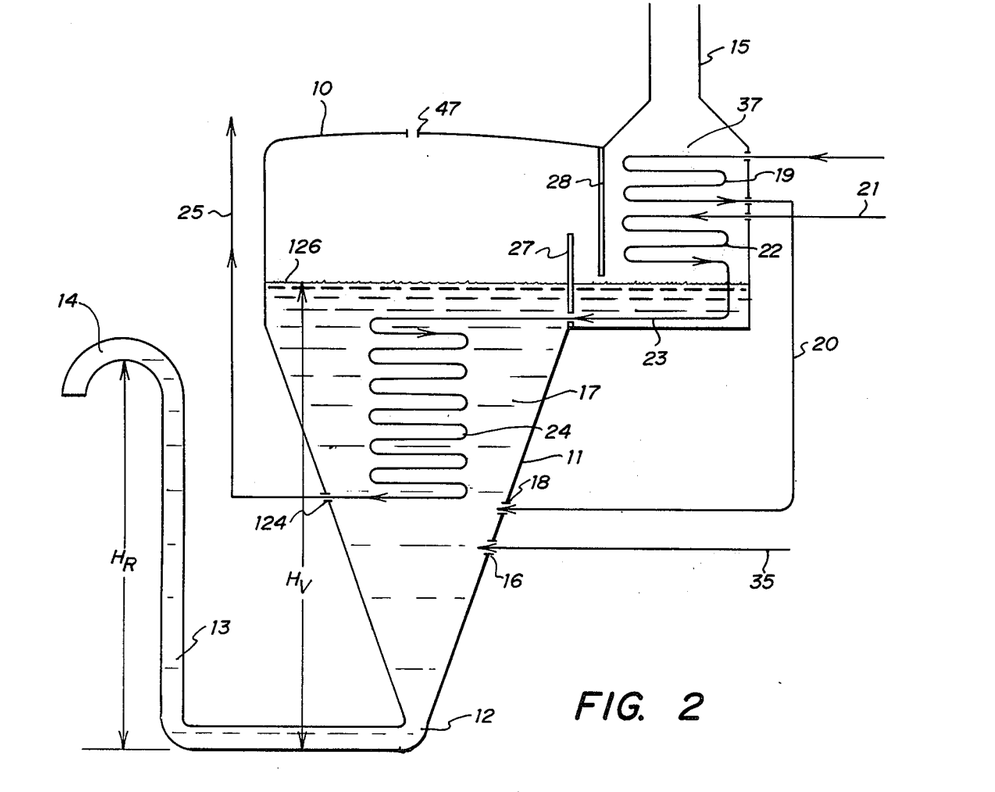
FIG. 2 is a more detailed diagram of the combustion unit of FIG. 1.

FIGS. 1 and 2 illustrate a preferred embodiment of the invention comprising a feed system 30, a combustion-desulfurization unit 31, and a regeneration unit 32.

As shown in FIG. 1, feed system 30 comprises a hopper 33, nozzle 34, and conduit 35 for delivering the carbonaceous fuel, i.e., sulfur-containing communited coal and/or crude oil, and the impurity collector to the combustion-desulfurization unit 31. In addition, feed system 30 includes a hopper 45 containing pulverized salt which functions to deliver salt to combustion-desulfurization unit 31 for the purpose of forming the initial molten bath of salt and any makeup quantities of salt that may be desired. Various salts or mixtures thereof can be used in the scope of this invention and will be described in detail hereinbelow.

The ratio between the impurity collector and the sulfur-containing carbonaceous fuel such as coal can be varied, depending upon the impurity content of the carbonaceous fuel. Generally, it is preferable to have a sufficient quantity of impurity collector to completely stoichiometrically react with impurities within the carbonaceous fuel. Thus, it is preferred that the molar equivalents of the collector used in the process at least equal the molar equivalents of impurity such as sulfur within the carbonaceous fuel. However, it is to be understood tht quantities of collector in excess of this amount such as for example up to about twice this amount can be used in the process of the subject invention. For example, the sulfur content in sulfur-containing coal used in the scope of this invention will generally vary between about 0.7 and 4.5 weight percent thereof. Therefore, with each 100 parts by weight of the above-described sulfur-containing coal, then correspondingly, from about 2.19 to about 14.1 parts by weight of a calcium carbonate collector can be utilized to completely react with the sulfur impurity. Furthermore, the particle size of the sulfur-containing coal can range from about minus 3 to about plus 100 mesh (U.S. Standard). The corresponding particle size of the collector, such as limestone, can range between about minus 4 and plus 200 mesh (U.S. Standard).

Furthermore, while the preferred embodiment shown in the drawings will be described in relation to removing sulfur and silicate impurities from coal with limestone as the collector, it is to be understood that any other sulfur-containing carbonaceous material, such as fuel oil, can be used as fuel, and any other alkaline-earth metal carbonate or oxide can be used as the collector in place of the limestone. The more preferred collectors utilized in the scope of this invention are selected from calcium carbonate, calcium oxide, magnesium carbonate, and magnesium oxide. As an example, where high sulfur fuel oil containing a sulfur content of between about 0.7 and 5.8 weight percent is to be desulfurized, the feed to the combustion-desulfurization unit 31 should correspondingly contain from about 2.19 to about 18.1 parts by weight of the limestone collector for each 100 parts by weight of fuel oil to completely react with the sulfur impurity. In this instance the particle size of the collector should also be in the range of from about minus 4 to about plus 200 mesh (U.S. Standard).

Continuing with the description, the bed of molten salt is maintained within vessel 10 to the level indicated in FIG. 1. The salt is initially supplied to vessel 10 via hopper 45, conveyor 46, and port 47. The maintenance of the molten salt bed will be described in detail below.

Compressed air is injected into nozzle 34 from where the coal-limestone-air mixture is blown through conduit 35 into a nozzle 16. It is noted that pure oxygen or any other suitable oxygen containing gas can be supplied to conduit 25 within the scope of the subject invention, however, the particular embodiment shown in the drawing will be described in relation to air as the oxygen supply source. Nozzle 16 is tangentially located in the cone-shaped bottom portion of vessel 10 in combustion unit 31.

In addition to the heavy-walled steel vessel 10 containing a molten salt bath 17, combustion unit 31 includes a preheating unit 37 mounted in the path of the desulfurized flue gases exiting through chimney 15.

Unit 37 contains a preheater assembly 19 for preheating compressed air which enters vessel 10 through tangentially placed nozzle 18 to provide complete combustion. Thus, the air or other oxygen containing gas supplied to vessel 10 via nozzle 18 and nozzle 16 should preferably contain at least enough oxygen to fully stoichiometrically react with the carbonaceous fuel and the oxidizable impurities therein such as sulfur. Generally, it is most preferred that oxygen in excess of the stoichiometric amount required for complete combustion be supplied to the molten salt bath. Unit 37 also contains a preheater assembly 22 for preheating feed water circulating in steam coils 24 embedded in salt bath 17. The high pressure steam produced in coils 24 exits through port 124 to conduit 25 for such industrial uses as driving turbogenerators of an electric power plant.

Bottom outlet 12 of vessel 10 is connected to an adjustable riser pipe 13 through which molten salt slurry containing calcium sulfate and calcium silicate particles, as well as other impurities, flows into water bath 39 of regeneration unit 32. The resulting solution of soluble salt is pumped out of water bath 39 by pump 41 and through conduit 42 to inlet 43 of vessel 10. Pump 41 can be automatically energized and deenergized by means of a salinity-sensing device 44.

Referring now to the more detailed illustration of FIG. 2, vessel 10 is shown containing a molten salt bath 17 preferably comprising sodium carbonate, sodium chloride or potassium chloride having melting points of 1564°, 1472°, and 1429° F, respectively. In the practice of this invention, the use of sodium carbonate is generally preferred over sodium chloride or potassium chloride because of the non-corrosive character of its decomposition or vapor phase products. However, it is to be understood that many salts can be used in the scope of the subject invention.

The term "salt" as used in the scope of the subject invention includes normally solid compounds which have melting points below about 1,600° F and boiling points above about 2,000° F, and which will not deleteriously effect the process of oxidation of the carbonaceous fuel, and the reaction between the collector and the impurities within the carbonaceous fuel. Thus, the term salt as used in the scope of the subject invention includes a group of compounds which fall within the classic definition of a salt (e.g., a normally solid compound derived from an acid by replacing the hydrogen wholly or partially with a metal or an electropositive radical and which is dominantly ionic in character and has a high melting point), as well as certain basic inorganic compounds such as sodium hydroxide which are not conventionally classified as salts. A representative but not exclusive list of other suitable salts or salt mixtures which can be used in the practice of this invention is given in Table I below. Each of the entries is water soluble, and has a melting point below about 1600° F and a boiling point above about 2000° F to provide an environment in liquid form which is ideal for the combustion of coal or oil.

TABLE I

| Salt | SALTS | | | | |
|---|---|---|---|---|---|
| | Sp. Gr. (g/cc) | Melting Point ° C. | ° F. | Boiling Point ° C. | ° F. |
| Na$_2$CO$_3$ | 2.51 | 851 | 1564 | — | — |
| B$_2$O$_3$ | 1.84 | 577 | 1071 | 1860 | 3380 |
| CaCl$_2$ | 2.15 | 772 | 1422 | >1600 | >2912 |
| KBr | 2.75 | 730 | 1346 | 1435 | 2615 |
| KCl | 1.98 | 776 | 1429 | 1500 subl | 2732 |
| KOH | 2.04 | 360 | 681 | 1320–1324 | 2408–2415 |
| (KPO$_3$)$_6$ | 2.11 | 810 | 1490 | 1320 | 2408 |
| MgCl$_2$ | 2.32 | 708 | 1306 | 1412 | 2574 |
| MnCl$_2$ | 2.98 | 650 | 1202 | 1190 | 2174 |
| NaBr | 3.20 | 755 | 1391 | 1390 | 2534 |
| NaCl | 2.16 | 800 | 1472 | 1413 | 2575 |
| NaOH | 2.13 | 318 | 605 | 1390 | 2534 |
| Na$_2$B$_4$O$_7$ | 2.87 | 741 | 1366 | — | — |
| LiCl | 2.07 | 613 | 1135 | 1353 | 2467 |
| LiF | 2.60 | 870 | 1598 | 1676 | 3049 |
| Li$_2$CO$_3$ | 2.11 | 618 | 1144 | — | — |

The fuel to be desulfurized and the collectors to be used constitute further criteria in selecting a suitable salt. The salt or salt mixture should have a density less than that of the alkaline-earth metal collector as well as the sulfates and silicates formed from the reaction between the collector and the impurities, and preferably a density greater than the coal or oil to be desulfurized. This density difference causes the coal and oil to spiral upward and allows the continuous removal of the heavier impurities by gravity separation. A representative list of alkaline-earth metal sulfates and silicates together with their specific gravities or densities is given in Table II below.

TABLE II

| ALKALINE-EARTH METAL SULFATES AND SILICATES | | | |
| --- | --- | --- | --- |
| Compound | Sp. Gr. or Density (g/cc) | Compound | Sp. Gr. or Density (g/cc) |
| $BaSiO_3$ | 4.40 | $MgSiO_3$ | 3.28 |
| $BaSO_4$ | 4.50 | $MgSO_4$ | 2.66 |
| $CaSiO_3$ | 2.91 | $SrSiO_3$ | 4.65 |
| $CaSO_4$ | 2.96 | $SrSO_4$ | 3.96 |

By way of example, if a collector such as lime having a specific gravity of 3.38 g/cc is to be mixed with coal which has a specific gravity generally in the range of 1.1 to 1.8 g/cc, or fuel oil which has a specific gravity generally in the range of 0.8 to 0.96 g/cc, then a salt having a specific gravity greater than the coal or oil used but less than about 2.96 g/cc (the specific gravity of calcium sulfate) should be used.

To contain the combustion process, vessel 10 is constructed of a steel capable of withstanding temperatures up to about 2500° F. In addition, the vessel and its connected piping are heavily insulated to minimize heat losses. The bottom section 11 of vessel 10 is preferably cone-shaped to attain a cyclone effect due to the whirling motion of the molten salt mass resulting from the tangentially injected fuel and air. The cyclone effect enhances the gravity separation of heavier impurities from the lighter molten salt bath.

Section 11 is provided with a bottom outlet 12 to eliminate the heavy slurry containing particles of calcium sulfate, calcium silicate, and other heavy impurities and by-products. Outlet 12 is connected to disposal conduit 38 through riser pipe 13 and slurry conduit 14. The height of riser pipe 13 is adjustable to achieve the proper elimination rate of slurry from the system. Riser pipe 13 may also be equipped with a mechanical stirring device (not shown) to keep slurry particles in suspension.

As previously mentioned, powdered coal or fuel oil together with ground limestone (or another suitable collector) is injected tangentially into vessel 10 through nozzle 16. The centrifugal forces created by the tangential injection into the cone-shaped portion of vessel 10 create a gravitational separation effect causing the lighter coal and injection air to spiral upward in salt bath 17, while the sulfates, silicates, and other heavy impurities are forced downward towards outlet 12.

Additional air under pressure is preheated in assembly 19, which i mounted in the path of the desulfurized flue gases passing through a chimney 15, and injected tangentially into salt bath 17 through conduit 20 and nozzle 18 to complete the combustion process in the vessel 10.

The feed-water supply is pumped through pipe 21 into preheater assembly 22 which is also mounted in the path of the desulfurized flue gases. The preheated water moves through conduit 23 to steam generating coils 24 immersed in salt bath 17 of vessel 10. After vaporizing in coils 24, the high pressure steam leaves the vessel 10 through port 124 and conduit 25 to a steam driven turbogenerator plant for generation of electric power.

Two baffles 27 and 28 are provided to force the effluent gases resulting from combustion in vessel 10 to pass through the molten salt bath at level 126 under baffle 28. Thus the flue gases undergo an additional cleaning before being released through chimney 15 to the atmosphere.

The detailed operation of a preferred embodiment of the subject invention will be described in relation to the combustion of coal containing a high sulfur content and using limestone as the collector.

In operation, vessel 10 is filled with solid salt, e.g., sodium chloride or potassium chloride, from hopper 45. Steam which has been heated to a temperature above the melting point of the salt is then circulated through coils 24 to melt the salt. Alternately, coal or oil can be fired in the furnace until the temperatures is high enough to melt solid salt, and then the solid salt may be added from hopper 45.

Heated to its melting point, dry salt absorbs heat very rapidly and becomes a dense, slightly cloudy liquid with the appearance of salad oil, though its temperature may be running above 1600° F. Having boiling points far above their melting points, molten salts return their high heat and remain stable over a wide temperature range. Further, molten salts act as a catalyst at lower temperatures and pressures than would otherwise be required without themselves entering into the reaction. Thus, molten salts with their melting point in the combustion range of coal or oil, and their boiling point sufficiently higher to keep the entire process in liquid form, provide an optimum environment for burning fuel.

The high-sulfur coal together with the pulverized limestone is injected with air through nozzle 16 into molten salt bath 17. For complete combustion: additional compressed air is heated in assembly 19 and injected through nozzle 18 into salt bath 17.

At a temperature above the melting point of the salt bath, the injected coal in the presence of air will oxidize immediately, thus generating the heat to maintain the salt bath temperature and to generate high-pressure steam in coils 24.

In the presence of excess oxygen, any sulfur compounds present in the coal or fuel oil will oxidize into sulfur oxides. Simultaneously, the injected limestone particles will decompose in the salt bath to form calcium oxide and carbon dioxide. The released sulfur oxide then combines with the calcium oxide to form calcium sulfate, which is insoluble in the molten salt bath. Likewise, any silicate impurities will react with the calcium oxide to form insoluble calcium silicate.

More specifically, the specific gravity of coal is generally in the range of 1.1 to 1.8 g/cc. As compared to a specific gravity of 2.51 for sodium carbonate, 2.16 g/cc for sodium chloride and 1.98 g/cc for potassium chloride, any unburned coal particles rise to the surface of the salt bath where the combustion process is completed. The calcium sulfate with a specific gravity of about 2.96 g/cc and the calcium silicate with a specific gravity of about 2.91 g/cc drops to the bottom of the molten salt bath.

The whirling motion is in the salt bath caused by the tangential mounting of injection nozzles 16 and 18 further facilitates the gravity separation process. Within the salt bath there will be an upwardly spiraling movement of burning coal particles with excess oxygen, and gaseous oxidation products, and a simultaneously downwardly spiraling movement of the heavier calcium sulfate and calcium silicate particles with other heavy impurities.

A slurry of molten salt mixed with the heavier impurities will accumulate in the bottom of vessel 10 and move through outlet 12 into riser pipe 13. Mechanical stirring devices in riser pipe 13 (not shown) will keep the mixture in motion to prevent the impurities from settling out and clogging the pipe orifice.

With the adjustable height of pipe 13 and being $H_R$ and the height of the molten salt column in vessel 10 being $H_V$, the ratio of $H_R$ to $H_V$ will be equilibrium be equal to the ratio of the specific gravity of the salt bath to the average specific gravity of the slurry in pipe 13. By adjusting the height of pipe 13, the slurry can be caused to overflow through conduit 14 and into disposal conduit 38 as soon as an excess of slurry begins to accumulate inside vessel 10. The slurry overflow is directed through conduit 38 into a water bath 39 where the soluble salt dissolves and the residue of insoluble sulfates and silicates are removed.

When the salt concentration of the water bath reaches a predetermined value as sensed by sensor 44, the salt solution is pumped by pump 41 from bath 39 through conduit 42 and into inlet 43 of vessel 10. In vessel 10, the water evaporates and the soluble salt returns to the molten salt bath 17.

Where valuable impurities such as uranium compounds are present in the salt slurry of vessel 10, a recovery process may be used to extract the impurities from the residue of bath 39.

Figure 3:
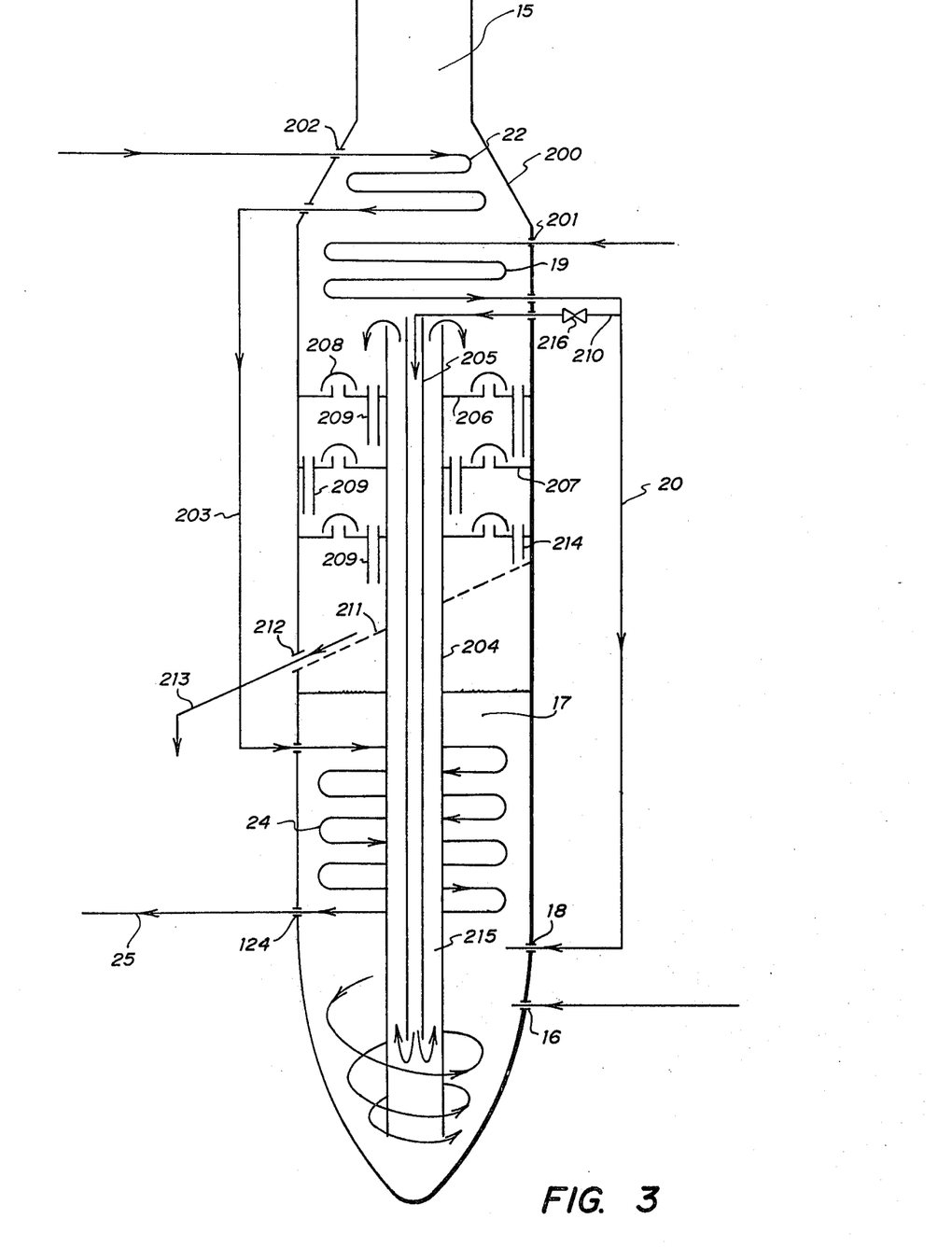
FIG. 3 is a diagrammatic illustration of a second embodiment of the invention including an airlift system to remove impurities and further purify the flue gases.

A second embodiment of the invention is illustrated in FIG. 3 where an airlift system is used to lift the accumulated slurry above the molten salt bath to provide an additional cleansing of the flue gas and to remove impurities without recycling the salt slurry through a water bath.

High-sulfur coal or fuel oil together with a collector such as limestone, and air is injected through nozzle 16 into molten salt bath 17 filling the bottom part of vertical reactor vessel 200. For complete combustion, compressed air is injected through port 201 into preheater assembly 19, where the air is heated by flue gases exiting through chimney 15. The heated air is then transmitted through conduit 20 to nozzle 18. Nozzles 16 and 18 are disposed tangentially to cause a whirling action and a cyclone effect to facilitate the gravity separation of heavy impurities to the bottom of molten salt bath 17.

Feed water is injected through port 202 into preheater assembly 22 to be heated by exiting flue gases. The feed water is then transmitted through conduit 203 to steam coils 24 which are embedded in the molten salt bath 17. The salt bath vaporizes the feed water in coils 24 to generate high-pressure steam which exits through port 124 and conduit 25 to a turbogenerator plant.

In the center of vessel 200, a vertical pipe 204 is mounted with a smaller diameter airlift tubing 205 inserted therein and extending almost to a point vertically above the end of pipe 204. Circular trays 206, 107, and 214 are connected between the inner walls of vessel 200 and the outer circumference of pipe 204. The trays are vertically stacked with each tray having loosely capped passages 208 (bubble caps) extending above the tray and uncapped passages 209 (down commers) extending partially above and primarily below the tray. The capped passages 208 for each tray are aligned along a common longitudinal axis, while the uncapped passages 209 of each tray are horizontally staggered.

Conduit 210 having valve 216 disposed therein is provided to divert part of the compressed air in conduit 20 to airlift tubing 205. The airlift system comprising pipe 204 and tubing 205 causes the slurry accumulating at the bottom of vessel 200 to be lifted through annulus 215 to the top of pipe 204, where it spills over onto circular tray 206.

Flue gas forming from the combustion of coal or fuel oil in salt bath 17 will rise through caps 208 to be given additional contact and exposure to the calcium oxide in the slurry. The slurry passes through down commers 209 to drop on screen 211. Screen 211 removes the particles of impurities such as calcium sulfate and calcium silicate from the slurry, and allows the soluble salt to pass therethrough and return to salt bath 17. The impurities filtered from the slurry by screen 211 are gravity-fed through port 212 and conduit 213 for waste disposal or regeneration.

In accordance with the invention there is provided a process for removing sulfur and other impurities from high-sulfur coal or fuel oil during combustion in a molten salt bath. An alkaline-earth metal carbonate or oxide is mixed with the fuel an injected with pressurized gas containing oxygen into a vessel having a molten salt bath were combustion occurs. The reaction products between the collector and impurities and/or oxidation product of the impurities which include sulfates and silicates are then precipitated by gravity separation to form a slurry at the bottom of the salt bath. The slurry is then cycled through a water bath or air lifted to be filtered through a screen to continually regenerate the soluble salts within the vessel.

Having described the invention in accordance with certain specific embodiments thereof, it is to be understood that further modifications may now suggest themselves to those skilled in the art and it is intended to cover such modifications as fall within the scope of the appended claims.

I claim:

1. A method of removing sulfur from a carbonaceous fuel during combustion comprising:
   a. providing a molten bath of a salt;
   b. passing into said bath:
      i. said fuel containing sulfur;
      ii. a collector which will form a compound with said sulfur which is insoluble in said molten salt; and
      iii. oxygen for combustion of said fuel;
   c. allowing said fuel to combust and said compound to form in said molten salt bath; and
   d. removing from said molten salt bath a slurry formed from vaporous products of combustion and said compound by a process which includes the step of adjusting the height of a vertically disposed conduit connected to an outlet in the bottom of said bath to a height sufficient to divert a column of said slurry from said bath.

2. A method of removing sulfur from a carbonaceous fuel during combustion comprising:
   a. forming a molten bath of a salt which has a melting point below about 1600° F and a boiling point above about 2000° F;
   b. passing into said molten salt bath:
      i. said fuel containing sulfur;

ii. a collector selected from alkaline earth metal oxides and carbonates; and
iii. sufficient oxygen to completely oxidize said carbonaceous fuel containing sulfur, thereby forming vaporous products of combustion including sulfur oxide which is reacted with said collector to form an alkaline earth metal sulfate; and
c. separating gaseous products of combustion and said alkaline earth metal sulfate from said molten salt bath by a process which includes agitating said bath to facilitate gravity separation of a slurry of said sulfate and other impurities and removing said slurry from said bath by a method which includes the step of adjusting the height of a vertically disposed conduit connected to an outlet in the bottom of said bath, thereby diverting a column of said slurry from said bath.

3. A system for removing sulfur and other impurities from a carbonaceous fuel during combustion; which comprises:
a. an enclosed vessel having inlet and outlet ports;
b. a molten salt bath filling the bottom of said vessel;
c. an alkaline-earth metal collector;
d. a mixture including said fuel and said collector;
e. means for injecting said mixture into said salt bath;
f. means for injecting a gas comprising oxygen under pressure into said salt bath;
g. means for removing precipitates from said salt bath and regenerating said salt bath; and
h. means for recycling flue gases through said salt bath prior to venting to atmosphere.

4. The system set forth in claim 3 wherein said means for recycling flue gases includes a chimney structure connected to a side of said vessel but separated therefrom by a pair of baffles.

5. The system set forth in claim 4 wherein one of said pair of baffles extends upward from the base of said structure to a vertical distance above the surface level of said molten salt bath, and the second of said pair is horizontally staggered from said one of said pair and extends downward from the roof of said vessel a vertical distance below the surfce of said molten salt bath.

6. The system set forth in claim 3 whereinsaid means for removing precipitates includes a vertically disposed conduit connected between an outlet port in the bottom of said vessel and a conduit leading to a water bath, a salinity sensor within said bath connected to a pump, a conduit leading from said water bath to said pump, and a conduit leading from said pump to an inlet port of said vessel.

7. The system set forth in claim 4 wherein said means for injecting preheated gas includes a pressurized oxygen containing gas source, a heat exchanger assembly within said chimney structure through which pressurized gas flows, and a nozzle disposed tangentially in the wall of said vessel.

8. The system as set forth in claim 3 whereinsaid means for injecting said mixture includes a hopper, a pressurized oxygen containing gas source, a nozzle connected to said hopper and to said source, a nozzle disposed tangentially in the wall of said vessel, and a conduit between said two nozzles.

9. The system as set forth in claim 3 wherein said mixture includes a granular coal having a sulfur content between 0.7 and 4.5 weight percent and a preferred particle size between about minus 3 and about plus 100 mesh (U.S. Standard), and wherein said collector is granular limestone having a preferred particle size between about minus 4 and about plus 200 mesh (U.S. Standard).

10. The system set forth in claim 9 wherein the number of molar equivalents of said limestone is at least equal to the number of molar equivalents of said sulfur in said coal.

11. The system as set forth in claim 3 wherein said mixture includes fuel oil with a sulfur content between 0.7 and 5.8 weight percent, and wherein said collector is limestone having a preferred particle size between about minus 4 and about plus 200 mesh (U.S. Standard).

12. The system set forth in claim 11 wherein the number of molar equivalents of said limestone is at least equal to the number of molar equivalents of said sulfur in said oil.

13. The system as set forth in claim 3 wherein said salt bath includes salts and salt mixtures having a melting point below about 1600° F. and a boiling point above about 2000° F.

14. The system set forth in claim 3 wherein said salt bath includes molten salts and molten salt mixtures having a density less than that of said collector, greater than that of said fuel and less than that of sulfates and silicates formed from said collector.

15. A method of utilizing sulfur containing carbonaceous fuel for generating thermal energy comprising:
a. introducing pulverized coal and oxygen into a molten salt mass contained in a retort;
b. passing a heat exchange fluid through said mass to extract thermal energy therefrom;
c. separating by gravity flow to the bottom of said retort the unchanged impurities of density higher than that of said molten mass and the compounds formed during combustion having densities greater than that of said mass;
d. passing the materials removed by gravity separation into an aqueous bath to form a highly saline slurry; and
e. introducing said slurry into said retort to flash the water therefrom and return the salt to the combustion mass.

16. The method set forth in claim 15 wherein the reaction rate in said retort is controlled by a regulated flow therein of a gas comprising oxygen.

17. The method set forth in claim 15 wherein the extraction of heavy bodies from said retort is controlled by selecting the relative density of materials to be extracted relative to the density of said molten salt mass.

18. A process for extracting thermal energy and removing sulfur and other impurities from a carbonaceous fuel during combustion which comprises:
a. forming a bath of molten salt within a retort;
b. introducing under pressure a mixture of said fuel, an alkaline earth metal collector and preheated gas comprising oxygen in said bath;
c. regulating the flow of said mixture to control the reaction rate within said retort;
d. removing from said bath a slurry of precipitates including compounds formed during combustion and impurities extracted from vaporous combustion products by a method which includes mounting an outlet in the apex of the cone-shaped bottom of said retort and removing said slurry of precipitates therefrom; and e. passing a heat exchange fluid through a heat exchange zone part of which is in the path of effluent gases and part of which is immersed in said bath.

19. The process of claim 18 wherein the step of introducing said mixture includes the steps of introducing said fuel preheated air and said collector into said bath through tangentially disposed nozzles within the sides of said cone-shaped bottom to cause a cyclone effect in said bath facilitating gravity separation of combustion product precipitates.

20. The process of claim 19 wherein the step of removing said slurry includes the steps of adjusting the height of a vertically disposed conduit connected to said outlet to a height sufficient to divert a column of said slurry from said bath, introducing said slurry column into a water bath to gravity separate insoluble precipitates, and injecting the high saline solution remaining in said water bath into said retort to regenerate said salt bath.

21. The method of claim 18 wherein the specific gravity of said molten salt is greater than said carbonaceous fuel but less than said alkaline earth metal sulfate.

22. The process of claim 18 wherein said bath is formed from a water soluble salt having a melting point below about 1600° F and a boiling point above about 2000° F.

23. The process of claim 22 wherein said bath has a density less than that of said collector, greater than that of said fuel, and less than that of said slurry.

* * * * *

UNITED STATES PATENT OFFICE
CERTIFICATE OF CORRECTION

Patent No. 3,989,010　　　　　　　Dated Nov. 2, 1976

Inventor(s) Jan J. Arps

It is certified that error appears in the above-identified patent and that said Letters Patent are hereby corrected as shown below:

Col. 4, line 64, "tht" should be --that--.
Col. 7, line 57, "i" should be --is--.
Col. 8, line 18, "temperatures" should be --temperature--;
　　　line 25, "return" should be --retain--.
Col. 9, line 13, "be" (1st occurrence) should be --at--;
　　　line 63, "107" should be --207--.
Col. 10, line 13, after "through" insert --bubble--;
　　　line 27, "an" should be --and--;
　　　line 29, "were" should be --where--;
　　　line 37, "accordance" should be --connection--.
Col. 11, line 44, "whereinsaid" should be --wherein said--;
　　　line 58, "whereinsaid" should be --wherein said--.
Col. 12, line 19, cancel "as".

Signed and Sealed this

First Day of March 1977

[SEAL]

Attest:

RUTH C. MASON
*Attesting Officer*

C. MARSHALL DANN
*Commissioner of Patents and Trademarks*